United States Patent
Richter et al.

(10) Patent No.: US 8,784,941 B2
(45) Date of Patent: *Jul. 22, 2014

(54) PROCESS FOR THE PRODUCTION OF A DARK-COLOR MULTI-LAYER COATING

(75) Inventors: Gunter Richter, Wuppertal (DE); Karl-Friedrich Doessel, Wuppertal (DE); Wilfried Dutt, Wermelskirchen (DE)

(73) Assignee: Axalta Coating Systems IP Co., LLC, Wilmington, DE (US)

( * ) Notice: Subject to any disclaimer, the term of this patent is extended or adjusted under 35 U.S.C. 154(b) by 491 days.

This patent is subject to a terminal disclaimer.

(21) Appl. No.: 13/063,207

(22) PCT Filed: Sep. 14, 2009

(86) PCT No.: PCT/US2009/056788
§ 371 (c)(1),
(2), (4) Date: Mar. 10, 2011

(87) PCT Pub. No.: WO2010/030970
PCT Pub. Date: Mar. 18, 2010

(65) Prior Publication Data
US 2011/0171375 A1  Jul. 14, 2011

Related U.S. Application Data

(60) Provisional application No. 61/096,966, filed on Sep. 15, 2008.

(51) Int. Cl.
*B05D 1/36* (2006.01)
*B05D 7/00* (2006.01)
*B05D 5/00* (2006.01)
*B05D 5/06* (2006.01)

(52) U.S. Cl.
USPC ........ 427/407.1; 427/409; 427/410; 427/384; 427/385.5; 427/388.1

(58) Field of Classification Search
USPC ........ 427/407.1, 409, 410, 372.2, 384, 385.5, 427/388.1
See application file for complete search history.

(56) References Cited

U.S. PATENT DOCUMENTS

| | | | |
|---|---|---|---|
| 6,762,240 B2 * | 7/2004 | Swarup et al. | 524/560 |
| 7,001,952 B2 * | 2/2006 | Faler et al. | 525/185 |
| 8,512,802 B2 * | 8/2013 | Dutt et al. | 427/203 |
| 2006/0286303 A1 * | 12/2006 | Avgenaki et al. | 427/372.2 |
| 2007/0071901 A1 * | 3/2007 | Avgenaki et al. | 427/384 |
| 2008/0274028 A1 * | 11/2008 | Lin et al. | 423/263 |
| 2011/0171375 A1 * | 7/2011 | Richter et al. | 427/160 |
| 2011/0195180 A1 * | 8/2011 | Richter et al. | 427/160 |

FOREIGN PATENT DOCUMENTS

WO  2009146317 A1  12/2009

OTHER PUBLICATIONS

JP 2007-206260 A: Machine Translation of Detailed Description.*
European Patent Office, International Search Report and Written Opinion for Application No. PCT/US2009/056788, mailed Oct. 11, 2010.
European Patent Office, International Preliminary Report on Patentability, for Application No. PCT/US2009/056788, mailed Mar. 24, 2011.

* cited by examiner

Primary Examiner — William Phillip Fletcher, III
(74) Attorney, Agent, or Firm — Ingrassia Fisher & Lorenz, P.C.

(57) ABSTRACT

A process for the production of a dark-color multi-layer coating, comprising the successive steps:
(1) applying an NIR-opaque coating layer A' from a waterborne pigmented coating composition A to a substrate,
(2) applying a coating layer B' from a waterborne pigmented coating composition B onto the substrate provided with coating layer A',
(3) subjecting the coated substrate obtained in step (2) to a drying step,
(4) applying a clear coat layer, and
(5) curing the coating layers simultaneously;
wherein both coating compositions A and B comprise aqueous microgel and sheet silicate,
wherein the pigment content of coating composition A comprises <90 wt. % of aluminum flake pigments and has such a composition that coating layer A' exhibits low NIR absorption,
wherein the pigment content of coating composition B consists 50 to 100 wt. % of black pigment with low NIR absorption and 0 to 50 wt. % of further pigment.

15 Claims, No Drawings

PROCESS FOR THE PRODUCTION OF A DARK-COLOR MULTI-LAYER COATING

FIELD OF THE INVENTION

The invention is directed to a process for the production of a dark-color multi-layer coating.

DESCRIPTION OF THE PRIOR ART

Dark-color coatings often contain carbon black pigments which absorb radiation in the near-infrared wavelength range and transform it into heat. Substrates coated with paint coatings of this type heat up in the NIR-containing sunlight; this occurs via heat conduction, i.e., heat is directly transferred to the substrate from the coating layer containing carbon black pigments and heated by solar radiation. This type of heating is often undesirable; for example, it may be undesirable for the actual substrate material itself and/or for the interior of the substrate to be heated up. Motor vehicles are probably the most prominent examples of substrates which comprise an interior. Vehicles with light-color coatings do not heat up as much and less fuel is required to operate the vehicle air-conditioning system than in corresponding models painted in a dark color.

A method is known from US 2006/0286303 A1 for producing multi-layer coatings, during which a substrate provided with an electrodeposition coating layer is provided in a wet-on-wet-on-wet coating process (=wet-on-wet-on-wet paint application process in the course of which three paint layers are successively applied and jointly cured without intermediate curing of each individual paint layer) with a first coating layer made of an aqueous coating composition, which contains 200 to 500 nm thick aluminum platelet pigments, then with a coating layer in a layer thickness below black/white opacity and which is made of a waterborne base coat, and finally with a clear coating layer. The aqueous coating composition used for the production of the first coating layer may contain carbon black pigments. The waterborne base coat may contain various pigments, inter alia carbon black pigments.

A method is known from US 2007/0071901 A1 for producing multi-layer coatings, during which a substrate provided with an electrodeposition coating layer is provided in a wet-on-wet-on-wet coating process with a first coating layer made of an aqueous coating composition, which contains metal flake pigments which are 10 to 100 nm thick, then with a coating layer made of a waterborne base coat, and finally with a clear coating layer. The waterborne base coat may contain various pigments, inter alia carbon black pigments.

SUMMARY OF THE INVENTION

It has been found that substrates with dark-color multi-layer coatings which heat up only comparatively slightly in sunlight may be produced using the wet-on-wet-on-wet coating process described hereinafter.

The invention is directed to a process for the production of a dark-color multi-layer coating, comprising the successive steps:
(1) applying an NIR-opaque coating layer A' from a waterborne pigmented coating composition A to a substrate,
(2) applying a coating layer B' from a waterborne pigmented coating composition B onto the substrate provided with coating layer A',
(3) subjecting the coated substrate obtained in step (2) to a drying step,
(4) applying a clear coat layer from a clear coat composition onto the coated substrate obtained in step (3), and
(5) curing the coating layers applied in steps (1), (2), and (4) simultaneously;
wherein both waterborne coating compositions A and B comprise aqueous microgel (waterborne microgel, microgel present in water-dispersed form) and sheet silicate,
wherein the pigment content of coating composition A comprises <90 wt. % (weight-%) of aluminum flake pigments and is composed in such a way that NIR-opaque coating layer A' exhibits low NIR absorption,
wherein the pigment content of coating composition B consists 50 to 100 wt. % of at least one black pigment with low NIR absorption and 0 to 50 wt. % of at least one further pigment, which is selected in such a way that coating layer B' exhibits low NIR absorption and that the dark-color multi-layer coating exhibits a brightness $L^*$ (according to $CIEL^*a^*b^*$, DIN 6174), measured at an illumination angle of 45 degrees to the perpendicular (surface normal) and an observation angle of 45 degrees to the specular (specular reflection), of at most 10 units.

Apart from the pigmentation of both coating compositions A and B, it is also essential in the practice of the present process that both coating compositions A and B comprise aqueous microgel and sheet silicate. It has been found that the combination of aqueous microgel and sheet silicate in each of the coating compositions A and B prevents intermixing of the coating compositions once applied to a substrate. Preventing the intermixing allows to achieve both the desired dark-color shade and the low heat development in sunlight although coating compositions A and B and the clear coat composition are applied wet-on-wet-on-wet. The desired dark-color shade and the low heat development in sunlight can even be achieved when the wet-on-wet-on-wet coating process is carried out in the context of an industrial mass production coating process, i.e., in an industrial painting facility which allows only for short time intervals between the three paint application steps. The short time intervals between the three paint application steps result from the fact that the substrates to be coated are traveling along a continuously moving painting line.

DETAILED DESCRIPTION OF THE EMBODIMENTS

The term "dark-color multi-layer coating" is used in the description and the claims. It refers to multi-layer coatings exhibiting a brightness $L^*$ (according to $CIEL^*a^*b^*$, DIN 6174), measured at an illumination angle of 45 degrees to the perpendicular and an observation angle of 45 degrees to the specular, of at most 10 units. Examples of such dark colors are corresponding dark-green, dark-blue, dark-red, dark-brown, dark-grey and black color shades and they include solid colors (single-tone colors) and special effect colors (colors characterized by color and/or brightness flop dependent on the angle of observation) like metallic and/or mica color shades.

The measurement of the brightness $L^*$ at an illumination angle of 45 degrees to the perpendicular and an observation angle of 45 degrees to the specular is known to the person skilled in the art and can be carried out with commercial professional measuring instruments, for example, the instrument X-Rite MA 68 sold by the firm X-Rite Incorporated, Grandeville, Mich., USA.

The abbreviation "NIR" used in the description and the claims stands for "near infrared" or "near infrared radiation" and shall mean infrared radiation in the wavelength range of 780 to 2100 nm.

The term "NIR-opaque coating layer" is used in the description and the claims. It refers to a dried or cured pigmented coating layer with a film thickness at least as thick that underlying substrate surfaces (substrate surfaces located directly beneath the coating layer) with different NIR absorption are no longer discernible by NIR reflection measurement (no longer distinguishable from each other by NIR reflection measurement), i.e., at or above this minimum dry film thickness no difference can be determined when measuring the NIR reflection of the coating layer applied to such different substrate surfaces and dried or cured; or to put it into other words, the NIR reflection curve measured is then only determined by the NIR-opaque coating layer. In still other words, an NIR-opaque coating layer is characterized in that its dry film thickness corresponds to or exceeds said minimum film thickness, but may not fall below it. It goes without saying that this minimum film thickness depends on the pigmentation of the respective coating layer, i.e., it depends on the composition of the pigment content as well as on the pigment/resin solids weight ratio. In order to determine said minimum film thickness, the respective coating composition may be applied in a wedge shape onto a black and white chart and dried or cured. Black and white charts are typically used when determining black/white opacity of coating compositions (see, for example, ISO 6504-3:2006 (E), method B). NIR reflection measurement is known to the person skilled in the art and can be carried out making use of a conventional NIR spectrophotometer (measuring geometry 8°/d), for example, the instrument Lambda 19 sold by the firm Perkin-Elmer. NIR-opacity of an NIR-opaque coating layer can be the result of NIR absorption and/or NIR reflection and/or NIR scattering.

The term "film thickness" is used herein. It refers always to the dry film thickness of the respective dried or cured coating. Accordingly, any film thickness values indicated in the description and in the claims for coating layers refer in each case to dry film thicknesses.

The term "pigment content" is used herein. It means the sum of all the pigments contained in a coating composition without fillers (extenders, extender pigments). The term "pigments" is used here as in DIN 55944 and covers, in addition to special effect pigments, inorganic white, colored and black pigments and organic colored and black pigments. At the same time, therefore, DIN 55944 distinguishes between pigments and fillers.

The term "aluminum flake pigment" is used herein. It means aluminum pigments, in particular those of the non-leafing type, as are conventionally used as special effect pigments in paint and coatings to provide a metallic effect, i.e., a brightness flop dependent on the angle of observation. Generally, such aluminum flake pigments are 100 to 1000 nm thick and have a mean particle diameter of, for example, 5 to 50 µm, preferably 5 to 35 µm. Examples of such commercially available aluminum flake pigments include those sold by Eckart under the names "STAPA Hydrolac®", "STAPA Hydrolux®" and "STAPA IL Hydrolan®". However, aluminum flake pigments with a thinner flake thickness of 10 to 80 nm, preferably 20 to 80 nm, are also meant by the term "aluminum flake pigment" used herein. Generally such thin aluminum flake pigments have a mean particle diameter of, for example, 5 to 30 µm, preferably 5 to 20 µm. Examples of such thin commercially available aluminum flake pigments include those sold under the names Metalure®, Silvershine® and Hydroshine®, in each case by Eckart, Metasheen® by Ciba, Starbrite® by Silberline and Decomet® by Schlenk.

The term "mean particle diameter" (average particle size) is used herein. It refers to d50 values determined by laser diffraction (50% of the particles have a particle diameter above and 50% of the particles have a particle diameter below the mean particle diameter).

The term "resin solids" is used herein. The resin solids of a coating composition consist of the solids contribution of the coating binders (binder solids) and the solids contribution of crosslinkers (crosslinker solids) optionally contained in the coating composition.

The term "black/white opacity" is used herein. It refers to the dry film thickness of a pigmented coating composition wherein the contrast between the black and white fields of a black and white chart coated with the coating composition is no longer visually discernible (mean film thickness value determined on the basis of evaluation by 5 independent individuals). It goes without saying that this film thickness depends on the pigmentation of the respective coating layer, i.e., it depends on the composition of the pigment content as well as on the pigment/resin solids weight ratio. Following ISO 6504-3:2006 (E), method B, in order to determine said film thickness, the pigmented coating composition of which the black/white opacity is to be investigated may be applied in a wedge shape onto a black and white chart and dried or cured.

The term "coating layer A' exhibiting low NIR absorption" is used in the description and the claims. It shall mean an NIR-opaque coating layer A' which exhibits an NIR reflection of at least 48% over the entire wavelength range of 780 to 1600 nm and of at least 30% over the entire wavelength range of above 1600 to 2100 nm. The NIR reflection measurement can be carried out as explained above.

The term "coating layer B' exhibiting low NIR absorption" is used in the description and the claims. It shall mean a coating layer B' which would exhibit an NIR reflection of at least 33% over the entire NIR wavelength range of 780 to 2100 nm, if it were applied and dried or cured on an NIR-opaque coating layer pigmented exclusively with aluminum flake pigment. The person skilled in the art may, for example, produce test panels provided with a dried or cured coating layer applied from a coating composition pigmented exclusively with aluminum flake pigment, and may use said test panels as test substrates for coating with coating compositions to be tested for their NIR absorption. Once the coating layer applied from the coating composition to be tested has dried or cured, the NIR reflection of said coating layer can be measured. The NIR reflection measurement itself can be carried out as explained above. The method mentioned in this paragraph can be used by the skilled person when developing the pigmentation of a coating composition B.

In step (1) of the process according to the invention substrates are coated with an NIR-opaque coating layer A' exhibiting low NIR absorption. The substrates may comprise various materials including, for example, metals and plastics including metal parts, metal foils, plastic parts and plastic foils; parts may or may not comprise an interior. The substrates may be uncoated or provided with a precoating consisting of one or more coating layers. In particular, the uncoated or precoated substrates are substrates which exhibit considerable NIR absorption as a property of the substrate material itself and/or as a property of a precoating; this may be the case, for example, if the substrate material and/or at least one relevant coating layer of the precoating contain(s) a certain amount of pigments with strong NIR absorption such as carbon black, for example, 0.1 to 10 wt. % of carbon black. The substrates include, in particular, vehicles which can be used for transporting people and/or goods as well as corresponding vehicle parts and accessories, wherein the term "vehicle" includes motorized and unmotorized vehicles including aircraft, water craft, rail vehicles and road vehicles.

In particular, the substrates are road vehicles and road vehicle parts, more specifically car bodies, car body parts and car body fittings which have generally been precoated. Car bodies or car body parts made of metal generally comprise, for example, an electrodeposition primer and, optionally, a primer surfacer layer applied thereto whilst car body parts or car body fittings made of plastics material may be provided with a plastics primer.

In an embodiment the substrates comprise car bodies or car body metal parts provided with an electrodeposition primer, wherein the electrodeposition primer contains carbon black, for example, 0.5 to 4 wt. % of carbon black.

In a further embodiment the substrates comprise car bodies or car body metal parts provided with an electrodeposition primer and a primer surfacer layer, wherein both the electrodeposition primer and the primer surfacer layer or only the primer surfacer layer contain(s) carbon black, for example, 0.5 to 4 wt. % of carbon black.

The invention is most useful in the context of coating substrates, such as, in particular car bodies or car body parts, in an industrial painting facility, in particular one which allows only for short time intervals between the three paint application steps (1), (2) and (4).

The NIR-opaque coating layer A' applied in step (1) of the process of the present invention is applied from a waterborne pigmented coating composition A. In addition to its pigment content, sheet silicate and water, coating composition A comprises a resin solids content which comprises aqueous microgel and the following optional components: organic solvents, fillers different from sheet silicate and conventional coating additives.

The resin solids of coating composition A comprise aqueous microgel or, more precisely, the respective microgel solids (the solids contribution of the aqueous microgel). The microgel may be composed of various types of internally crosslinked polymers, in particular (meth)acrylic microgel particles (internally crosslinked (meth)acrylic polymer microparticles).

(Meth)acryl is to be understood, both here and in the following, as acryl and/or methacryl.

Preparation of (meth)acrylic microgels may be carried out by methods that are well known and routinely practiced by those of ordinary skill in the art, in particular by methods including free-radical polymerization. (Meth)acrylic microgels are internally crosslinked (meth)acrylic copolymers mainly derived from one or more alkyl (meth)acrylates, optionally together with other ethylenically unsaturated copolymerizable monomers like styrene and vinyl esters. Suitable alkyl (meth)acrylates include, without limitation, alkyl (meth)acrylates having 1-18 carbon atoms in the alkyl group. Since the (meth)acrylic microgel is required to be formed with internal crosslinking, there may be included in the monomers from which the microgel is prepared a minor proportion of at least one monomer which is polyfunctional with respect to the polymerization reaction, such as ethylene glycol di(meth)acrylate, hexanediol di(meth)acrylate, allyl (meth)acrylate or divinylbenzene.

Alternatively, there may be included in the monomers minor proportions of two other monomers carrying pairs of functional groups which can be caused to react with one another either during or after polymerization, such as epoxy and carboxyl (as for example, in the combination of glycidyl (meth)acrylate and (meth)acrylic acid), anhydride and hydroxyl (as for example, in the combination of maleic anhydride and hydroxy alkyl (meth)acrylate), or isocyanate and hydroxyl (as for example, in the combination of isocyanato alkyl (meth)acrylate and hydroxy alkyl (meth)acrylate).

There also is preferably included in the monomers from which the (meth)acrylic microgel is prepared minor amounts of a hydroxyl containing monomer for external crosslinking purposes after application of coating composition A to the substrate. Examples of hydroxyl containing monomers include in particular hydroxy alkyl (meth)acrylates.

Acid functional monomers such as (meth)acrylic acid are also preferably included in the monomer mix to ionically stabilize the (meth)acrylic microgel in water or in the aqueous dispersion medium by converting such groups to a suitable salt by reaction with a base, such as, amines or aminoalcohols.

Suitable aqueous (meth)acrylic microgels include crosslinked polymer microparticle aqueous dispersions such as disclosed in U.S. Pat. No. 4,403,003 or U.S. Pat. No. 4,539,363.

The aqueous microgel preferably contains appropriate functional groups, such as hydroxyl groups, whereby they can become crosslinked, after application of coating composition A to the substrate, by means of an external crosslinking agent.

The aqueous microgel particles exhibit a mean particle diameter in the range of, for example, 80 to 400 nm, preferably 90 to 200 nm.

The aqueous microgel or, more precisely, the microgel solids may form the binder solids of coating composition A. However, in an embodiment the microgel solids form only part of the binder solids of coating composition A, for example, 30 to below 100 wt. % of the binder solids; in other words, in said embodiment the binder solids of coating composition A comprise one or more further water-dilutable binders in addition to the aqueous microgel. Examples of such further water-dilutable binders include water-dilutable polyester, polyurethane and (meth)acrylic copolymer resins and also hybrid binders derived from these resin classes. The further water-dilutable binders may in particular be polymer polyols having a hydroxyl number of, for example, 50 to 200 mg KOH/g. Generally, the water-dilutability of the water-dilutable binders results from ionic and/or nonionic stabilizing groups contained therein, such as, in particular carboxylate groups and/or hydrophilic polyether moieties.

Furthermore the binder solids of coating composition A may comprise one or more paste resins (grinding resins; resins used for pigment grinding) or polymeric pigment wetting or dispersion aids.

The binder solids of coating composition A may also comprise oligomeric polyether glycols, for example, low molecular weight polypropylene and/or polyethylene glycol. These oligomeric substances can be involved in crosslinking, after application of coating composition A to the substrate, by linking them through their hydroxyl groups that are reactive with an external crosslinker (crosslinking agent, curing agent).

Apart from the binder solids, the resin solids of coating composition A may comprise one or more conventional crosslinkers. If coating composition A comprises crosslinkers, the latter are comprised in a proportion of, for example, 10 to 35 wt. % of the resin solids of coating composition A. Examples of suitable crosslinkers include free or blocked polyisocyanates and aminoplast resins, in particular alkylated melamine-formaldehyde condensates.

It is preferred that the resin solids of coating composition A are crosslinkable; i.e., it is preferred that the resin solids of coating composition A comprise at least one aqueous microgel with crosslinkable functional groups, in particular hydroxyl groups, and at least one crosslinker. If coating composition A comprises one or more further water-dilutable binders in addition to the aqueous microgel, it is preferred that the further water-dilutable binder(s) also has (have) crosslinkable functional groups, in particular hydroxyl groups.

In an embodiment, the resin solids of coating composition A comprise 20 to 70 wt. %, preferably 45 to 65 wt. % aqueous microgel, 10 to 35 wt. %, preferably 15 to 25 wt. % aminoplast resin, preferably a methylated melamine formaldehyde condensate, 0 to 30 wt. % water-dilutable polyester polyol resin, 0 to 35 wt. %, preferably 5 to 25 wt. % water-dilutable polyurethane polyol and 0 to 15 wt. % polyether glycol.

Coating composition A comprises a pigment content which is composed in such a way that NIR-opaque coating layer A' exhibits low NIR absorption. This means that, in case the pigment content comprises only one single pigment, the latter is selected in such a way that NIR-opaque coating layer A' exhibits low NIR absorption. In case there is a combination of two or more pigments with different NIR absorption power the proportion of each of the pigments is selected taking into account the NIR absorption of each individual pigment. The person skilled in the art may easily determine the NIR absorption of a pigment, for example, by pigmenting a coating composition with the pigment in question and aluminum flake pigment in a pigment weight ratio of 10:90, i.e., without using other pigments, by applying and drying or curing the coating composition thus pigmented in an NIR-opaque film thickness, and by measuring the NIR reflection of the resultant coating layer over the entire wavelength range of 780 to 2100 nm. The NIR reflection can be measured as explained above for the measurement of the NIR reflection of an NIR-opaque coating layer.

The pigment(s) contained in coating composition A (the pigment(s) making up the pigment content of coating composition A) may be special effect pigments and/or pigments selected from white, colored and black pigments provided that the pigment content of coating composition A comprises <90 wt. % of aluminum flake pigments and is composed in such a way that NIR-opaque coating layer A' exhibits low NIR absorption. Generally, the pigment/resin solids ratio by weight of coating composition A is, for example, 0.1:1 to 2:1.

Examples of special effect pigments include conventional pigments imparting to a coating a color and/or brightness flop dependent on the angle of observation, such as, metal flake pigments, in particular, aluminum flake pigments, interference pigments such as, for example, metal oxide-coated metal pigments, for example, iron oxide-coated aluminum, coated mica such as, for example, titanium dioxide-coated mica, iron oxide in flake form, liquid crystal pigments, coated aluminum oxide pigments, and coated silicon dioxide pigments.

Examples of white, colored and black pigments are conventional inorganic or organic pigments known to the person skilled in the art, such as, for example, titanium dioxide, carbon black, iron oxide pigments, azo pigments, phthalocyanine pigments, quinacridone pigments, pyrrolopyrrole pigments, and perylene pigments.

It is preferred that coating composition A does not contain any carbon black.

In an embodiment the pigment content of coating composition A comprises less than 25 wt. % of aluminum flake pigments, in particular no aluminum flake pigment.

In another embodiment coating composition A is a solid color (single-tone color) coating composition free of special effect pigments.

In still another embodiment the pigment content of coating composition A comprises 80 to 100 wt. %, in particular 90 to 100 wt. % of titanium dioxide.

With the exception of special effect pigments, the pigments that are contained in the pigment content of coating composition A are generally ground. Grinding is generally performed until at least 70% of the maximum tinting strength achievable in the non-volatile system of coating composition A is achieved (non-volatile system of coating composition A means resin solids of coating composition A plus non-volatile additives of coating composition A). The determination of the maximum tinting strength is known to the person skilled in the art (compare, for example, DIN 53238). The grinding may be performed in conventional assemblies known to the person skilled in the art. Generally, the grinding takes place in a proportion of the binder or in a paste resin. The formulation is then completed with the remaining proportion of the binder or of the paste resin.

The possible special effect pigments are not ground, but are generally initially introduced in the form of a commercially available paste, optionally, combined with organic solvents and, optionally, polymeric pigment wetting or dispersion aids and/or other additives, and then mixed with the binder(s). Special effect pigments in powder form may first be processed with organic solvents and, optionally, polymeric pigment wetting or dispersion aids and/or other additives to yield a paste.

Coating composition A comprises at least one sheet silicate (layered silicate) in a total proportion of, for example, 0.1 to 1.6 wt. %, preferably 0.2 to 1 wt. %, based on the total coating composition. The sheet silicate(s) are known to the person skilled in the art and conventionally used in connection with coatings, for example, aluminium-magnesium, sodium-magnesium and sodium-magnesium-lithium silicates with a layered structure. Examples of such sheet silicates are sheet silicates of the bentonite, smectite, montmorillonite and hectorite type. Naturally occurring sheet silicates may be used, but synthetically manufactured sheet silicates are preferred. It may be convenient if the sheet silicates used are washed grades. Examples of commercially available sheet silicates which may be used in coating composition A are the Optigel® products (from Südchemie Moosburg, Germany), Laponite® RD (from Solvay, Rheinberg, Germany) or Borchigel® sheet silicates (from Borchers, Monheim, Germany).

Apart from the sheet silicate(s), as one type of fillers, coating composition A may also contain one or more other fillers different from sheet silicate, for example, in a total proportion of up to 20 wt. %, based on the resin solids. For the sheet silicate and the possible other fillers the same principles apply as are valid for the pigments, i.e., they are selected in such a way that NIR-opaque coating layer A' exhibits low NIR absorption. The other fillers may have a mean particle diameter of, for example, 20 nm to 3 µm. Examples are barium sulfate, kaolin, talcum, silicon dioxide, and any mixtures thereof. The sheet silicate and the possible other fillers do not constitute part of the pigment content of coating composition A.

Coating composition A may contain conventional additives in a total quantity of, for example, 0.1 to 5 wt. %, relative to its solids content. Examples are neutralizing agents, antifoaming agents, wetting agents, gassing inhibitors, adhesion promoters, catalysts, leveling agents, anticratering agents, rheology control agents, thickeners and light stabilizers, for example, UV absorbers and/or HALS compounds (HALS, hindered amine light stabilizers).

Coating composition A comprises water in a proportion of, for example, 55 to 90 wt. % and, optionally, also one or more organic solvents in a total proportion of, for example, 0 to 20 wt. %.

Examples of organic solvents which can be used in coating composition A include alcohols, for example, propanol, butanol, hexanol; glycol ethers, for example, diethylene glycol di-C1-C6-alkyl ether, dipropylene glycol di-C1-C6-alkyl ether, ethoxypropanol, ethylene glycol monobutyl ether; glycol esters, for example, ethylene glycol monobutyl ether acetate; esters, for example, butyl acetate, amyl acetate; glycols, for example, ethylene glycol and/or propylene glycol, and the di- or trimers thereof; N-alkylpyrrolidone, for example, N-methylpyrrolidone; ketones, for example, methyl ethyl ketone, acetone, cyclohexanone; aromatic or aliphatic hydrocarbons, for example, toluene, xylene or linear or branched aliphatic C6-C12 hydrocarbons.

The overall solids content of coating composition A is in the range of 10 to 40 wt. %, in particular 20 to 40 wt. %, based on the total composition. Accordingly, the proportion of volatiles (volatile materials) is 60 to 90 wt. %, in particular 60 to 80 wt. %. The volatiles comprise the aqueous carrier and possible volatile additives. The aqueous carrier comprises water and the possible organic solvents.

In step (2) of the process of the present invention coating layer B' is applied from a waterborne pigmented coating composition B. In addition to its pigment content, sheet silicate and water coating composition B comprises a resin solids content which comprises aqueous microgel and the following optional components: organic solvents, fillers different from sheet silicate and conventional coating additives.

The resin solids of coating composition B comprise aqueous microgel or, more precisely, the respective microgel solids (the solids contribution of the aqueous microgel). With regard to the aqueous microgel the same is true as has been mentioned above in connection with the aqueous microgel forming a constituent of coating composition A. Therefore, to avoid unnecessary repetitions reference is made to the corresponding paragraphs above.

The aqueous microgel or, more precisely, the microgel solids may form the binder solids of coating composition B. However, in an embodiment the microgel solids form only part of the binder solids of coating composition B, for example, 30 to below 100 wt. % of the binder solids; in other words, in said embodiment the binder solids of coating composition B comprise one or more further water-dilutable binders in addition to the aqueous microgel. Examples of such further water-dilutable binders include water-dilutable polyester, polyurethane and (meth)acrylic copolymer resins and also hybrid binders derived from these resin classes. The further water-dilutable binders may in particular be polymer polyols having a hydroxyl number of, for example, 50 to 200 mg KOH/g. Generally, the water-dilutability of the water-dilutable binders results from ionic and/or nonionic stabilizing groups contained therein, such as, in particular carboxylate groups and/or hydrophilic polyether moieties.

Furthermore the binder solids of coating composition B may comprise one or more paste resins or polymeric pigment wetting or dispersion aids.

The binder solids of coating composition B may also comprise oligomeric polyether glycols, for example, low molecular weight polypropylene and/or polyethylene glycol. These oligomeric substances can be involved in crosslinking, after application of coating composition B to the substrate, by linking them through their hydroxyl groups that are reactive with an external crosslinker.

Apart from the binder solids, the resin solids of coating composition B may comprise one or more conventional crosslinkers. If coating composition B comprises crosslinkers, the latter are comprised in a proportion of, for example, 10 to 35 wt. % of the resin solids of coating composition B. Examples of suitable crosslinkers include free or blocked polyisocyanates and aminoplast resins, in particular alkylated melamine-formaldehyde condensates.

It is preferred that the resin solids of coating composition B are crosslinkable; i.e., it is preferred that the resin solids of coating composition B comprise at least one aqueous microgel with crosslinkable functional groups, in particular hydroxyl groups, and at least one crosslinker. If coating composition B comprises one or more further water-dilutable binders in addition to the aqueous microgel, it is preferred that the further water-dilutable binder(s) also has (have) crosslinkable functional groups, in particular hydroxyl groups.

In an embodiment, the resin solids of coating composition B comprise 20 to 70 wt. %, preferably 45 to 65 wt. % aqueous microgel, 10 to 35 wt. %, preferably 15 to 25 wt. % aminoplast resin, preferably a methylated melamine formaldehyde condensate, 0 to 30 wt. % water-dilutable polyester polyol resin, 0 to 35 wt. %, preferably 5 to 25 wt. % water-dilutable polyurethane polyol and 0 to 15 wt. % polyether glycol.

Coating composition B comprises a pigment content consisting 50 to 100 wt. % of at least one black pigment with low NIR absorption and 0 to 50 wt. % of at least one further pigment which is selected in such a way that coating layer B' exhibits low NIR absorption and that the multi-layer coating produced by the process of the present invention exhibits a brightness L* (according to CIEL*a*b*, DIN 6174), measured at an illumination angle of 45 degrees to the perpendicular and an observation angle of 45 degrees to the specular, of at most 10 units, wherein the sum of the wt. % equals 100 wt. %. The pigment/resin solids ratio by weight of coating composition B is, for example, 0.1:1 to 1:1.

A black pigment with low NIR absorption is one which, when pigmenting a coating composition with the respective black pigment and aluminum flake pigment in a pigment weight ratio of 10:90 and without using other pigments, results in the NIR reflection of a dried or cured coating layer applied from the coating composition in an NIR-opaque film thickness being at least 33% over the entire wavelength range of 780 to 2100 nm. The NIR reflection can be measured as explained above for the measurement of the NIR reflection of an NIR-opaque coating layer. Preferred examples of black pigments with low NIR absorption are iron oxide black pigments, mixed metal/iron oxide black pigments, for example, of the inverse spinel type, and, in particular, perylene black pigments. Examples of commercially available perylene black pigments are Paliogen Black L 0084 and Paliogen Black L 0086 from BASF.

The pigment content of coating composition B may consist exclusively of the at least one black pigment with low NIR absorption or it may also comprise above 0 to 50 wt. % of at least one further pigment which is selected in such a way that coating layer B' exhibits low NIR absorption and that the dark-color multi-layer coating produced by the process of the present invention exhibits a brightness L* (according to CIEL*a*b*, DIN 6174), measured at an illumination angle of 45 degrees to the perpendicular and an observation angle of 45 degrees to the specular, of at most 10 units. In other words, the selection of the at least one further pigment is performed in a manner meeting two conditions, namely condition (i) relating to the low NIR absorption of coating layer B' and, simultaneously, condition (ii) relating to the brightness L* of the dark-color multi-layer coating of at most 10 units.

This means with regard to condition (i): In case there is only one single further pigment its wt. % proportion is selected within said range of above 0 to 50 wt. % such that coating layer B' exhibits low NIR absorption; if the one single further pigment is a pigment with strong NIR absorption, the skilled person will select its wt. % proportion more at the lower end of said wt. % range, whereas in case of one single further pigment with low NIR absorption the opposite is possible. In case there is a combination of two or more further pigments with different NIR absorption power the same principles apply and the proportion of each of the further pigments may accordingly be selected within the range of above 0 to 50 wt. %, i.e., taking into account the NIR absorption of each individual further pigment.

At the same time this means with regard to condition (ii): In case there is only one single further pigment its wt. % proportion is selected within said range of above 0 to 50 wt. % such that the dark-color multi-layer coating exhibits a brightness $L^*$ (according to CIEL*a*b*, DIN 6174), measured at an illumination angle of 45 degrees to the perpendicular and an observation angle of 45 degrees to the specular, of at most 10 units; if the one single further pigment has a light color, the skilled person will not select its wt. % proportion at the upper end of said wt. % range, whereas in case of one single further pigment with a dark color this may be possible. In case there is a combination of two or more further pigments with not only different color but also different brightness the same principles apply and the proportion of each of the further pigments may accordingly be selected within the range of above 0 to 50 wt. %, i.e., taking into account the brightness of each individual further pigment.

The further pigment(s) that may optionally be contained in coating composition B, in addition to the at least one black pigment with low NIR absorption may, for example, be special effect pigments and/or pigments selected from white, colored and other black pigments (black pigments different from the black pigments with low NIR absorption).

Examples of special effect pigments that may be contained in coating composition B comprise the special effect pigments that have been previously mentioned as examples of special effect pigments that may be contained in coating composition A.

Examples of white, colored and other black pigments are conventional inorganic or organic pigments known to the person skilled in the art, such as, for example, titanium dioxide, carbon black, iron oxide pigments different from iron oxide black pigments, azo pigments, phthalocyanine pigments, quinacridone pigments, pyrrolopyrrole pigments, and perylene pigments different from perylene black pigments.

It is preferred that coating composition B does not contain any carbon black.

With the exception of the possible special effect pigments, the black pigment(s) with low NIR absorption and the possible further pigments are generally ground. Grinding is generally performed until at least 70% of the maximum tinting strength achievable in the non-volatile system of coating composition B is achieved (non-volatile system of coating composition B means resin solids of coating composition B plus non-volatile additives of coating composition B). The grinding may be performed in conventional assemblies known to the person skilled in the art. Generally, the grinding takes place in a proportion of the binder or in specific paste resins. The formulation is then completed with the remaining proportion of the binder or of the paste resin.

The possible special effect pigments are not ground, but are generally initially introduced in the form of a commercially available paste, optionally, combined with organic solvents and, optionally, polymeric pigment wetting or dispersion aids and/or other additives, and then mixed with the binder(s). Special effect pigments in powder form may first be processed with organic solvents and, optionally, polymeric pigment wetting or dispersion aids and/or other additives to yield a paste.

Coating composition B comprises at least one sheet silicate in a total proportion of, for example, 0.1 to 1.6 wt. %, preferably 0.2 to 1 wt. %, based on the total coating composition. Examples of suitable sheet silicates are the same as those mentioned above in connection with coating composition A.

Apart from the sheet silicate(s), as one type of fillers, coating composition B may also contain one or more other fillers different from sheet silicate, for example, in a total proportion of up to 20 wt. %, based on the resin solids. For the sheet silicate and the possible other fillers the same principles apply as are valid for the at least one further pigment, i.e., they are selected in such a way that coating layer B' exhibits low NIR absorption. The other fillers may have a mean particle diameter of, for example, 20 nm to 3 µm. Examples are barium sulfate, kaolin, talcum, silicon dioxide, and any mixtures thereof. The sheet silicate and the possible other fillers do not constitute part of the pigment content of coating composition B.

Coating composition B may contain conventional additives in a total quantity of, for example, 0.1 to 5 wt. %, relative to its solids content. Examples are neutralizing agents, antifoaming agents, wetting agents, adhesion promoters, catalysts, leveling agents, anticratering agents, rheology control agents, thickeners and light stabilizers, for example, UV absorbers and/or HALS compounds.

Coating composition B comprises water in a proportion of, for example, 55 to 90 wt. % and, optionally, also one or more organic solvents in a total proportion of, for example, 0 to 20 wt. %.

Examples of organic solvents which can be used in coating composition B are the same as those mentioned above in connection with coating composition A.

The overall solids content of coating composition B is in the range of 10 to 40 wt. %, in particular 20 to 40 wt. %, based on the total composition. Accordingly, the proportion of volatiles is 60 to 90 wt. %, in particular 60 to 80 wt. %. The volatiles comprise the aqueous carrier and possible volatile additives. The aqueous carrier comprises water and the possible organic solvents.

The multi-layer coating process of the present invention comprises the successive steps (1) to (5). In the course of the process coating layers A', B' and the clear coat layer are applied wet-on-wet-on-wet and simultaneously cured.

In step (1) of the process of the present invention coating composition A is applied in a film thickness so as to form an NIR-opaque coating layer A' exhibiting low NIR absorption. Generally the film thickness of coating layer A' will then also correspond to at least black/white opacity or be even higher. Not least for cost reasons NIR-opaque coating layer A' is not applied unnecessarily thick. Generally the film thickness of coating layer A' is in the range of, for example, 7 to 45 µm, preferably 9 to 35 µm. Application may be performed by any coating application method, in particular, spray coating including, for example, pneumatic and/or bell application. The spray application may be electrostatically assisted.

In step (2) of the process according to the invention coating composition B is applied onto the substrate provided with coating layer A'.

Coating composition B may be applied in a relatively thin film thickness to form a transparent coating layer B'; generally, the film thickness of a transparent coating layer B' is in the range of, for example, 4 to 20 µm. It is preferred however, that coating composition B is applied sufficiently thick so as to form a visually opaque coating layer B'; then its film thickness corresponds to or exceeds black/white opacity. The dry film thickness of a visually opaque coating layer B' is higher than that of a transparent coating layer B' and is generally in the range of, for example, 8 to 30 μm.

As already mentioned, coating layer B' may be transparent, and in this case the color shade of the dark-color multi-layer coating is determined by the contributions of both coating layers A' and B', although in general coating layer B' makes the main contribution to the color shade of the dark-color multi-layer coating. If coating layer B' is a visually opaque coating layer, it is the coating layer which determines the color shade of the dark-color multi-layer coating.

In the practice of the present invention, coating composition B can be applied over coating layer A' before the latter is dry. There may be no substantial evaporation of the volatiles from coating layer A' during the time between the completion of the application of coating composition A and the start of the application of coating composition B. In a preferred embodiment, coating composition B can even be applied to coating layer A' in such a manner that at least 50 wt. % of the volatiles of coating composition A are still present in coating layer A' when coating composition B is applied.

Coating composition B can be applied within, for example, 10 to 300 seconds, preferably within 1 to 4 minutes, of the application of coating composition A even under ambient conditions. Ambient conditions mean the environmental conditions in a typical industrial painting facility, for example, a temperature in the range of 15° C. to 35° C., in particular 18° C. to 28° C., a relative humidity in the range of 5 to 90%, in particular 50 to 70%, and, for a continuously moving painting line, a line speed in the range of 2 to 11 meters/minute. It is desirable to omit process steps that are not required, and thereby improve efficiency and reduce costs associated with such steps. It is thus an advantage that a forced or flash drying step between the application of coating compositions A and B is not required. As the person skilled in the art knows, forced or flash drying requires utilizing equipment such as blowers and/or heaters to remove volatiles at a faster rate than would occur under ambient conditions, or with ambient (unforced) air flow such as, for example, the normal airflow resulting from the movement of a substrate through space on a continuously moving painting line.

Application of coating composition B may be performed by any coating application method, in particular, spray coating including, for example, pneumatic and/or bell application. The spray application may be electrostatically assisted. Coating composition B can be applied at essentially the same temperature, humidity, and airflow conditions, i.e., under the same or similar spraybooth conditions, as used to apply coating composition A.

In step (3) of the process of the present invention the substrate provided with both coating layers A' and B' is subjected to a drying step, in particular a forced or flash drying step, to evaporate volatiles from coating layers A' and B' and set, but not initiate curing or crosslinking of, the coating layers A' and B' on the substrate. By set, it is meant that coating layers A' and B' are dried sufficiently that they are not disturbed or marred (waved or rippled) by air currents that may blow past the surface. In a preferred embodiment the volatiles are removed until a solids content of coating layers A' and B' of >90 wt. % is reached. The drying step can be conducted in heated and/or dehydrated air, such as, for example, using infrared radiation and/or convection drying. If the air is heated, it can be heated to a temperature in the range of, for example, 60° C. to 80° C. The evaporation of volatiles from the coating layers A' and B' can be carried out in open air, but is preferably carried out in a flash drying chamber in which heated and/or dehydrated air is circulated at low velocity to minimize airborne particle contamination. A typical flash drying chamber has blowers or fans positioned at the top and sides of the chamber so that the circulated air is directed in a manner that is substantially perpendicular to the surface of the substrate. The substrate can be moved through the flash drying chamber in an assembly-line manner at a rate that permits the evaporation of volatiles from the applied coating layers A' and B' as discussed above. The rate at which the substrate is moved through the flash drying chamber depends in part upon the length and configuration of the chamber. The flash drying step can take from, for example, 30 seconds to 10 minutes, in particular 2 to 5 minutes, as in an industrial mass-production coating process.

In step (4) of the process of the present invention a clear coat is applied by the wet-on-wet-on-wet paint application method, i.e., the clear coat is applied onto the still uncured coating layer B' (and the still uncured coating layer A' located beneath the still uncured coating layer B'). Generally such outer clear coat does not or essentially not contribute to the color shade of the dark-color multi-layer coating.

All known clear coats are in principle suitable as clear coat. Usable clear coats are here both solvent-containing one-component (1 pack) or two-component (2 pack) clear coats, aqueous one- or two-component clear coats, powder clear coats or aqueous powder clear coat slurries.

Clear coat application may be performed in a film thickness of, for example, 20 to 80 μm by any suitable coating application method, in particular, spray coating. The clear coat layer so applied may be subject to a short flash-off period of, for example, 2 to 10 minutes at ambient temperatures in the range of, for example, 20 to 40° C.

As already mentioned, the process of the present invention comprises a final step (5) of curing the coating layers applied in process steps (1), (2), and (4). The curing of the three coating layers (coating layers A', B' and the clear coat layer) is performed simultaneously as a joint thermal curing step (heat curing step), for example, a single bake. In case of thermally crosslinkable coating compositions A, B and clear coating compositions, the term "curing" used in the present description and the claims shall mean "crosslinking by formation of chemical bonds". Joint thermal curing of the three coating layers is performed by application of heat, for example, baking at an object temperature in the range of, for example, 60 to 180° C.

EXAMPLES

Unless otherwise noted, all components of the following examples are believed to be available from the Aldrich Chemical Company, Milwaukee, Wis. The following other components were used in the examples.

CYMEL® 303 melamine and DAOTAN® VTW 1236 aqueous aliphatic polyurethane dispersion are available from Cytec Industries, West Patterson, N.J.

SOLSPERSE® 20000 dispersant is available from the Lubrizol Corporation, Wickliffe, Ohio.

SURFYNOL® 104 nonionic surfactant is available from Air Products and Chemicals, Inc., Allentown, Pa.

PALIOGENBLACK® BLACK L 0086 pigment is available from BASF, Germany.

CARBON BLACK FW 200® pigment is available from Evonik Industries, Essen, Germany.

LAPONITE® RD sheet silicate is available from Southern Clay Products, Gonzales, Tex.

ACRYSOL® ASE 60 anionic thickener is available from Rohm and Haas (now part of the Dow Chemical Company, Midland Mich.), Philadelphia, Pa.

STAPA®HYDROLAN 9160 metal effect pigment is available from Altana/Eckart, Fürth, Germany.

TI-PURE® R-706 titanium dioxide pigment is available from DuPont.

Preparation of a Carbon Black Pigment Dispersion:

The following pigment slurry was prepared with 33.4 g (grams) of de-ionized water, 9.4 g of a 30% non-volatile hydroxy functional aqueous acrylic microgel, 18.8 g butoxyethanol, 14.1 g CYMEL® 303, 4.7 g SOLSPERSE® 20000 and 6.6 g of 10% aqueous dimethylethanol amine solution and 0.5 g SURFYNOL® 104. The above components were mixed together, 12.5 g of CARBON BLACK FW 200® pigment was added and the resulting slurry was pre-dispersed using a Cowles blade. The mixture was then ground in a horizontal beadmill until the desired particle size of less than 0.5 micron was achieved.

Preparation of a Perylene Black Pigment Dispersion:

The following pigment slurry was prepared with 27.5 g of de-ionized water, 7.7 g of a 30% non-volatile hydroxy functional aqueous acrylic microgel, 15.5 g butoxyethanol, 11.6 g CYMEL® 303, 3.9 g SOLSPERSE® 20000 and 5.4 g of 10% aqueous dimethylethanol amine solution and 0.4 g SURFYNOL® 104. The above components were mixed together, 28.0 g of PALIOGENBLACK® BLACK L 0086 pigment was added and the resulting slurry was pre-dispersed using a Cowles blade. The mixture was then ground in a horizontal beadmill until the desired particle size of less than 0.5 micron was achieved.

Preparation of a Titanium Dioxide Pigment Dispersion:

The following pigment slurry was prepared with 9.1 g of de-ionized water, 7.2 g of a 30% non-volatile hydroxy functional aqueous acrylic microgel, 3.0 g butoxyethanol, 5.2 g SOLSPERSE® 20000, 2.0 g of 10% aqueous dimethylethanol amine solution and 1.5 g SURFYNOL® 104. The above components were mixed together, 72.0 g of TI-PURE® R-706 pigment were added and the resulting slurry was pre-dispersed using a Cowles blade. The mixture was then ground in a horizontal beadmill until the desired particle size of less than 0.5 micron was achieved.

Preparation of a Rheology Base:

A homogeneous blend was prepared by mixing together and stirring 47.5 g of a 30% non-volatile hydroxy functional aqueous acrylic microgel, 2.0 g of butoxyethanol and 0.5 g of SURFYNOL® 104. Following this, 50.0 g of 3% LAPONITE® RD in de-ionized water was added under stirring and homogenized and dispersed using a horizontal beadmill.

Preparation of a Waterborne Carbon Black Coating Composition:

A waterborne carbon black coating composition was prepared by mixing together the following constituents under constant agitation in the order stated: 26.8 pbw (parts by weight) of a 30% non-volatile hydroxyl-functional aqueous acrylic microgel, 16.2 pbw of carbon black pigment dispersion, 5.8 pbw of CYMEL® 303, 13.8 pbw of rheology base, 1.0 pbw of SURFYNOL® 104, and 2.0 pbw of butoxyethanol. The viscosity of the coating composition was adjusted to within the desired range of 2000-4000 mPa·s at shear rate D=1 sec$^{-1}$, and the pH was adjusted to within the desired range of 8.2-8.8 using 34.4 pbw of a combination of (i) de-ionized water, (ii) a 10% non-volatile pre-neutralized solution of ACRYSOL® ASE 60 in de-ionized water and (iii) a 10% aqueous dimethylethanol amine solution in de-ionized water.

Preparation of a Waterborne Perylene Black Coating Composition 1:

A waterborne perylene black coating composition was prepared by mixing together the following constituents under constant agitation in the order stated: 26.8 pbw of a 30% non-volatile hydroxy functional aqueous acrylic microgel, 16.2 pbw of perylene black pigment dispersion, 5.8 pbw of CYMEL® 303, 13.8 pbw of rheology base, 1.0 pbw of SURFYNOL® 104, and 2.0 pbw of butoxyethanol. The viscosity of the coating composition was adjusted to within the desired range of 2000-4000 mPa·s at shear rate D=1 sec$^{-1}$, and the pH was adjusted to within the desired range of 8.2-8.8 using 34.4 pbw of a combination of (i) de-ionized water, (ii) a 10% non-volatile pre-neutralized solution of ACRYSOL® ASE 60 in de-ionized water and (iii) a 10% aqueous dimethylethanol amine solution in de-ionized water.

Preparation of a Comparative Waterborne Perylene Black Coating Composition 2:

This example shows the preparation of a waterborne perylene black coating composition without the addition of sheet silicate.

A waterborne perylene black coating composition was prepared by mixing together the following constituents under constant agitation in the order stated: 36 pbw of a 30% non-volatile hydroxy functional aqueous acrylic microgel, 16.2 pbw of perylene black pigment dispersion, 5.8 pbw of CYMEL® 303, 1.0 pbw of SURFYNOL® 104, and 2.0 pbw of butoxyethanol. The viscosity of the coating composition was adjusted to within the desired range of 2000-4000 mPa·s at shear rate D=1 sec$^{-1}$, and the pH was adjusted to within the desired range of 8.2-8.8 using 39 pbw of a combination of (i) de-ionized water, (ii) a 10% non-volatile pre-neutralized solution of ACRYSOL® ASE 60 in de-ionized water and (iii) a 10% aqueous dimethylethanol amine solution in de-ionized water.

Preparation of a Comparative Waterborne Perylene Black Coating Composition 3:

This example shows the preparation of a waterborne perylene black coating composition without the addition of the aqueous acrylic microgel.

The preparation of the waterborne perylene black coating composition 1 was repeated with the difference that the entire portion of the 30% non-volatile hydroxy functional aqueous acrylic microgel (including any aqueous acrylic microgel in the premixes used) was replaced by an aqueous polyurethane dispersion DAOTAN® VTW 1236. This replacement was performed according to an 1:1 replacement of binder solids. The viscosity of the coating composition was adjusted to within the desired range of 2000-4000 mPa·s at shear rate D=1 sec$^{-1}$, and the pH was adjusted to within the desired range of 8.2-8.8 using a combination of (i) de-ionized water, (ii) a 10% non-volatile pre-neutralized solution of ACRYSOL® ASE 60 in de-ionized water and (iii) a 10% aqueous dimethylethanol amine solution in de-ionized water.

Preparation of a Waterborne White Coating Composition 1:

A waterborne white coating composition was prepared by mixing together the following constituents under constant agitation in the order stated: 21.0 pbw of a 30% non-volatile hydroxy functional aqueous acrylic microgel, 2.0 pbw of STAPA® Hydrolan 9160, 4.2 pbw of CYMEL® 303, 21.0 pbw of titanium dioxide pigment dispersion, 0.2 pbw of perylene black pigment dispersion, 7.0 pbw of rheology base, 2.0 pbw of butoxyethanol, and 1.0 pbw of SURFYNOL® 104. The viscosity of the coating composition was adjusted to within the desired range of 2000-4000 mPa·s at shear rate D=1 sec$^{-1}$, and the pH was adjusted to within the desired range of 7.8-8.0 using 41.6 pbw of a combination of (i)

de-ionized water, (ii) a 10% non-volatile pre-neutralized solution of ACRYSOL® ASE 60 in de-ionized water and (iii) a 10% aqueous dimethylethanol amine solution in de-ionized water.

Preparation of a Comparative Waterborne White Coating Composition 2:

This example shows the preparation of a waterborne white coating composition without the addition of sheet silicate.

A waterborne white coating composition was prepared by mixing together the following constituents under constant agitation in the order stated: 26.5 pbw of a 30% non-volatile hydroxy functional aqueous acrylic microgel, 2.0 pbw of STAPA® Hydrolan 9160, 4.2 pbw of CYMEL® 303, 21.0 pbw of titanium dioxide pigment dispersion, 0.2 pbw of perylene black pigment dispersion, 2.0 pbw of butoxyethanol, and 1.0 pbw of SURFYNOL® 104. The viscosity of the coating composition was adjusted to within the desired range of 2000-4000 mPa·s at shear rate $D=1\ sec^{-1}$, and the pH was adjusted to within the desired range of 7.8-8.0 using 43.1 pbw of a combination of (i) de-ionized water, (ii) a 10% non-volatile pre-neutralized solution of ACRYSOL® ASE 60 in de-ionized water and (iii) a 10% aqueous dimethylethanol amine solution in de-ionized water.

Preparation of a Comparative Waterborne White Coating Composition 3:

This example shows the preparation of a waterborne white coating composition without the addition of the aqueous acrylic microgel.

The preparation of the waterborne white coating composition 1 was repeated with the difference that the entire portion of the 30% non-volatile hydroxy functional aqueous acrylic microgel (including any aqueous acrylic microgel in the pre-mixes used) was replaced by an aqueous polyurethane dispersion DAOTAN® VTW 1236. This replacement was performed according to an 1:1 replacement of binder solids. The viscosity of the coating composition was adjusted to within the desired range of 2000-4000 mPa·s at shear rate $D=1\ sec^{-1}$, and the pH was adjusted to within the desired range of 7.8-8.0 using a combination of (i) de-ionized water, (ii) a 10% non-volatile pre-neutralized solution of ACRYSOL® ASE 60 in de-ionized water and (iii) a 10% aqueous dimethylethanol amine solution in de-ionized water.

Solventborne Clear Coat Composition:

The clear coat composition used for the examples was a collision baking clear, commercially available from DuPont Performance Coatings (Standox), Christbusch 25, D-42285 Wuppertal, Germany, prepared by mixing STANDOCRYL® 2K-HS Clearcoat, 020-82497, with STANDOX® 2K-HS Hardener, 020-82403, in a 2:1 volume ratio.

Application of Waterborne Coating Compositions and Clear Coat:

10.5 cm×30 cm, 1 mm thick steel test panels were processed and prepared with standard automotive pre-treatment, and dried and cured layers of grey electrocoat and midgrey primer.

The test panels were coated by spray-applying the waterborne white coating compositions onto the surface of the midgrey primer. The waterborne white coating compositions were spray-applied in 20 μm dry layer thickness and dried for 2 minutes at 20° C. Then the waterborne black coating compositions were spray-applied in 10 μm dry layer thickness and dried for 5 minutes at 70° C. Finally the clear coat was spray-applied in 40 μm dry layer thickness and dried for 5 minutes at 20° C. The test panels were then put in an oven and bake cured for 20 minutes at 145° C. (object temperature).

The test panels so provided with a black multi-layer coating different from each other were tested as follows:

A rectangular, open wooden box (dimensions inside 9.5 cm×29.4 cm, dimensions outside 12.6 cm×31.9 cm, height inside 5 cm and height outside 6.5 cm) was provided with a digital thermometer inside. To this end, the temperature sensor was fixed on a copper panel (8.5 cm×25.3 cm, thickness 1 mm) at the bottom inside the box. The box was closed by using one of the 10 cm×30 cm black coated test panels as a lid with the black coated surface turned outside. Then the box was put on a table and illuminated from above with a halogen lamp (Osram, No. 64575, 1000 W) over 35 min (simulation of heating up in sunlight). The distance between the black coated test panel surface and the light source was 35 cm and the temperature in the test room was 23° C. The temperature increase ΔT within the box was measured. Table 1 shows the results.

The test panels were also visually assessed concerning color and occurrence of any unwanted color inhomogeneity (+, ok; –, color inhomogeneity; ––, strong color inhomogeneity).

Table 1 shows the results.

TABLE 1

| Multi-layer coating on the test panel: | ΔT (° C.) | Visual test |
|---|---|---|
| Waterborne white coating 1 + carbon black coating + clear coat (comparative example) | 24.9 | + |
| Waterborne white coating 1 + perylene black coating 1 + clear coat (according to the invention) | 16.7 | + |
| Waterborne white coating 1 + perylene black coating 2 + clear coat (comparative example) | 17.8 | – |
| Waterborne white coating 1 + perylene black coating 3 + clear coat (comparative example) | 16.7 | –– |
| Waterborne white coating 2 + perylene black coating 1 + clear coat (comparative example) | 17.5 | – |
| Waterborne white coating 3 + perylene black coating 1 + clear coat (comparative example) | 18.9 | –– |

What is claimed is:

1. A process for the production of a dark-color multi-layer coating, comprising the successive steps:
   (1) applying an NIR-opaque coating layer A' from a waterborne pigmented coating composition A to a substrate,
   (2) applying a coating layer B' from a waterborne pigmented coating composition B onto the substrate provided with coating layer A',
   (3) subjecting the coated substrate obtained in step (2) to a drying step,
   (4) applying a clear coat layer from a clear coat composition onto the coated substrate obtained in step (3), and
   (5) curing the coating layers applied in steps (1), (2), and (4) simultaneously;
   wherein both waterborne coating compositions A and B comprise aqueous microgel and sheet silicate,
   wherein the pigment content of coating composition A comprises <90 wt. % of aluminum flake pigments and is composed in such a way that NIR-opaque coating layer A' exhibits low NIR absorption,
   wherein the pigment content of coating composition B consists 50 to 100 wt. % of at least one black pigment with low NIR absorption and 0 to 50 wt. % of at least one further pigment, which is selected in such a way that coating layer B' exhibits low NIR absorption and that the dark-color multi-layer coating exhibits a brightness L* (according to CIEL*a*b*, DIN 6174), measured at an illumination angle of 45 degrees to the perpendicular and an observation angle of 45 degrees to the specular, of at most 10 units, and
   wherein the sum of the respective wt. % equals 100 wt. %.

2. The process of claim 1, wherein the pigment content of coating composition A comprises less than 25 wt. % of aluminum flake pigments.

3. The process of claim 1, wherein coating composition A is a solid color coating composition free of special effect pigments.

4. The process of claim 1, 2 or 3, wherein the pigment content of coating composition A comprises 80 to 100 wt. % of titanium dioxide.

5. The process of claim 4, wherein coating composition A does not contain any carbon black.

6. The process of claim 4, wherein coating composition A comprises a binder solids comprising 30 to 100 wt. % of aqueous microgel.

7. The process of claim 4, wherein coating composition A comprises 0.1 to 1.6 wt. % sheet silicate.

8. The process of claim 4, wherein the at least one black pigment with low NIR absorption is selected from the group consisting of iron oxide black pigments, mixed metal/iron oxide black pigments and perylene black pigments.

9. The process of claim 4, wherein coating composition B does not contain any carbon black.

10. The process of any claim 4, wherein coating composition B comprises a binder solids comprising 30 to 100 wt. % of aqueous microgel.

11. The process of claim 4, wherein coating composition B comprises 0.1 to 1.6 wt. % sheet silicate.

12. The process of claim 4, wherein coating layer B' is a transparent or a visually opaque coating layer.

13. The process of claim 4, wherein coating composition B is applied to coating layer A' when at least 50 wt. % of the volatiles of coating composition A are still present in coating layer A'.

14. The process of claim 4, wherein coating composition B is applied within 10 to 300 seconds of the application of coating composition A.

15. The process of claim 4 being carried out in the context of an industrial mass production coating process.

* * * * *